United States Patent
Sovio et al.

(10) Patent No.: US 7,343,014 B2
(45) Date of Patent: Mar. 11, 2008

(54) METHOD FOR SHARING THE AUTHORIZATION TO USE SPECIFIC RESOURCES

(75) Inventors: Sampo Sovio, Vantaa (FI); Nadarajah Asokan, Espoo (FI); Kaisa Nyberg, Helsinki (FI); Valtteri Niemi, Helsinki (FI)

(73) Assignee: Nokia Corporation, Espoo (FI)

( * ) Notice: Subject to any disclaimer, the term of this patent is extended or adjusted under 35 U.S.C. 154(b) by 856 days.

(21) Appl. No.: 10/621,258

(22) Filed: Jul. 15, 2003

(65) Prior Publication Data
US 2004/0062400 A1 Apr. 1, 2004

(30) Foreign Application Priority Data
Jul. 16, 2002 (EP) ................... 02015842

(51) Int. Cl.
*H04K 9/00* (2006.01)
*H04L 9/00* (2006.01)
(52) U.S. Cl. ................ 380/278; 380/279; 380/45
(58) Field of Classification Search ............. 380/45, 380/278–279, 281, 283, 285; 726/2, 4
See application file for complete search history.

(56) References Cited
U.S. PATENT DOCUMENTS
7,095,852 B2 * 8/2006 Wack et al. ............... 380/44
2005/0114666 A1 * 5/2005 Sudia ..................... 713/175

OTHER PUBLICATIONS

Pfleeger (Charles P. Pfleeger, "Security in computing", 2nd edition, 1996, ISBN: 0133374866), p. 271-276.*
Stallings (William Stallings, "Cryptography and network security", 2th edition, 1998, ISBN: 0138690170), p. 22-23 and 184-185.*
Philip MacKenzie and Michael Reiter, "Two-Party Generation of DSA Signatures", Lecture Notes in Computer Science, "Springer Berlin/Heidelberg, ISSN: 0302-9743", 2001.*
MacKenzie (MacKenzie and Reiter "Delegation of Cryptographic Servers for Capture-Resilient Devices", Proceedings of the 8th ACM conference on Computer and Communications Security, pp. 10-19, ISBN: 1-58113-385-5, 2001).*

(Continued)

*Primary Examiner*—Kambiz Zand
*Assistant Examiner*—Peter Poltorak
(74) *Attorney, Agent, or Firm*—Alfred A. Fressola; Ware, Fressola, Van Der Sluys & Adolphson LLP

(57) ABSTRACT

The invention relates to a method for sharing the authorization to use specific resources among multiple devices, which resources are accessible via messages on which a secret key operation was applied with a predetermined secret master key d available at a master device 11. In order to provide an optimized sharing of authorization, it is proposed that the master device 11 splits the secret master key d into two parts $d_1$, $d_2$. A piece of information relating to the first part $d_1$ of the secret master key d is forwarded to the slave device 13 for enabling this slave device to perform a partial secret key operation on a message m. The second part $d_2$ of the secret master key d is forwarded to a server 12 for enabling the server 12 to perform partial secret key operations on a message m received from the slave device 13.

31 Claims, 3 Drawing Sheets

OTHER PUBLICATIONS

Menezes et al. (Alfred J. Menezes, Paul C. van Oorschot, Scott A. Vanstone, "Handbook of applied cryptography", 1997, ISBN: 0849385237), p. 584-586.*

A. Arsenault and S. Farrell, "*Securely Available Credentials—Requirements,*" Network Working Group RFC 3157, Baltimore Technologies, Aug. 2001, 20pp.

D. Boneh et al., "*A Method for Fast Revocation of Public Key Certificates and Security Capabilities,*" 12pp.

C. Gehrmann and Kaisa Nyberg, "*Enhancements to Bluetooth Baseband Security,*" 15pp.

"*Call for Propossals for Content Protection & Copy Management Technologies,*" Digital Video Broadcasting, DVB CPT rev. 1.2, Jul. 5, 2001, 23pp.

C. Gehrmann, Kaisa Nyberg and C. Mitchell, "*The Personal CA—PKI for a Personal Area Network,*" 5pp.

P. MacKenzie and M. Reiter, "*Delegation of Cryptographic Servers for Capture-Resilient Devices,*" DIMACS Technical Report 2001-37, Nov. 2001, 38pp.

P. MacKenzie and M. Reiter, "*Networked Cryptographic Devices Resilient to Capture,*" DIMACS Technical Report 2001-19, May 2001, 38pp.

"*Securely Available Credentials (Sacred),*" last modified Mar. 4, 2003, 3pp.

* cited by examiner

METHOD FOR SHARING THE AUTHORIZATION TO USE SPECIFIC RESOURCES

CROSS-REFERENCE TO RELATED APPLICATIONS

This application claims priority under 35 USC §119 to European Patent Application No. 02015842.4 filed on Jul. 16, 2002.

FIELD OF THE INVENTION

The invention relates to a method for sharing the authorization to use specific resources among multiple devices, which resources are accessible via messages on which a secret key operation was applied with a predetermined secret key available at one of these devices. The invention relates equally to such devices and to a server supporting a sharing of authorization.

BACKGROUND OF THE INVENTION

It is known from the state of the art to provide an access to specific resources via a network only upon messages on which a secret key operation was performed. Such a secret key operation can be in particular signing the message digitally with a secret key or decrypting a received encrypted message based on a secret key. For example, bank account payment transactions or the purchase of rights for a piece of digital content may be enabled on-line with digitally signed messages.

Methods for generating digital signatures on messages in a distributed manner are proposed for example in the document "Networked cryptographic devices resilient to capture" in Proceedings of the 2001 IEEE Symposium on Security and Privacy, pp. 12-25, May 2001, by P. MacKenzie and M. K. Reiter. The presented methods are aimed at minimizing the impact of stolen devices by using a network server. They are based more specifically on function sharing between a device and a network server, e.g. on sharing a secret RSA signing key. For sharing a secret RSA (Rivest, Shamir and Adelman encryption) signing key d available at a device, the device provides a half-key $d_2$ to an untrusted server. Whenever needed, the device can recover the complementary half-key $d_1$ by asking the user to enter a password. The half-keys $d_1$ and $d_2$ satisfy the relation $d=d_1+d_2(\mod (N))$, where $N=pq$ is the RSA modulus, where p and q are different secret prime numbers available at the device, and where $(N)=(p-1)(q-1)$. After the initialization process, the secret values d, p and q will be deleted at the device. The user can then generate a signature on a message m by requesting a partial signature $m^{d2}(\mod N)$ from the server. Thereafter, the device can compute the entire signature based on the generated second half-key $d_1$ according to the equation $m^d=m^{d1}*m^{d2}(\mod N)$.

It is an underlying assumption of this method that there is only one device that uses the authorizations granted with a key pair $d_1$, $d_2$.

In some situations it might be desirable, however, to be able to use specific resources from several devices and/or by several users. An owner of a bank account which can be accessed on-line might wish to be able to access the account via several devices, for instance via a small mobile phone and a larger PDA (personal digital assistant). An owner of such a bank account might further wish to allow another person to access the account for a limited time at least to a limited extent.

A general approach for enabling a sharing of authorization is to define an authorization domain consisting of several personal devices. The authorization for a service is then granted to the domain, rather than to a specific device. A device is allowed access to the service if its membership in the authorization domain can be verified.

A more specific approach for enabling the use of resources from several devices has been proposed by the IETF sacred working group in "http://www.ietf.org/html-.charters/sacred-charter.html".

The IETF proposal aims at allowing users to utilize different user devices from which their authorizations can be used. To this end, two approaches are presented.

In the first approach, a user is enabled to create his/her credentials on one device and to securely upload them to a credential server. Thereafter, the user may download these credentials from the credential server to any device and use them there. The download process is controlled by an authentication of the user to the credential server. The authentication can be based in particular on passwords, since the user is not required to possess any personal device.

This first approach has the disadvantage that the credential server is an attractive point for attack. Further, depending on the details of the protocol, the credential server itself may have to be trusted to a high degree. For example, if the credentials are stored on the server encrypted with the user's password, the server will be able to mount a dictionary attack to recover the credentials. Moreover, in order to share the same resources among different users, the user to whom the credentials belong has either to enter his/her password personally to the device of another user, which is usually not possible, or to impart the password, which is usually not desired, since the password might be used also for other applications.

In the second approach presented by IETF, credentials are transferred directly from one user device to another user device. This approach has the disadvantage that it implies that a complete transfer of the credentials from one device to another is performed. That is, after the transfer, the credentials will not be usable in the original device any more. This prevents concurrent sharing of authorizations.

In both approaches, the devices receiving the credentials also have to be trusted to a large extent, since they receive the credentials in plain text. There is no transparent way to control what a client could do with the credentials, and it is not possible to revoke the authorizations granted to a client device. Thus, a partial sharing of authorization is not possible.

SUMMARY OF THE INVENTION

It is an object of the invention to provide an improved method for sharing the authorization to use specific resources among multiple devices.

It is in particular an object of the invention to enable a use of the same authorization concurrently from more than one device.

At the same time, the required level of trust on a server supporting the sharing of authorization is to be kept minimal. That is, the server by itself should not be able to use the shared authorization.

These objects are reached according to the invention with a method for sharing the authorization to use specific resources among multiple devices, which resources are accessible via messages on which a secret key operation was applied with a predetermined secret master key available at a master device. In the proposed method, the master device, which acts as a delegator of the authorization, splits in a first step the secret master key into a first part and a second part. The master device then forwards a piece of information relating to the first part of the secret master key to a slave device acting as a delegatee of the authorization. This piece of information enables the slave device to perform a partial secret key operation on messages based on the first part of the secret master key. Moreover, the master device forwards the second part of the secret master key to a server for enabling the server to perform a partial secret key operation on messages received from the slave device based on the second part of the secret master key.

The invention proceeds from the method presented in the above cited document by MacKenzie and Reiter. It is assumed that there is a master device that has a master secret key, e.g. a private key of a RSA key pair consisting of a private key and a public key. The master device acting alone will be able to fully utilize the authorizations granted to the public key by itself. But the master device is typically not expected to be used in day-to-day transactions. Instead, the master device delegates its authorizations fully or partially to one or more slave devices. These slave devices constitute an authorization domain. There is a network assistant (server) that helps slave devices to exercise the delegated authorization. Whenever a slave device is to be added to the authorization domain, the master device splits the available secret master key into two parts. The master device then transmits information on one part of the secret master key to the slave device and the other part directly or indirectly to the server.

With the presented method, a sharing of authorization is initialized. Now the slave device can transmit a request to the server that a partial secret key operation is to be performed on a message, and as a result the server returns a processed message, i.e. a partially signed or decrypted message. The slave is then able to compute the entire signed or decrypted message by combining the received message with a message on which the slave device applied its own part of the secret key in a partial secret key operation. Neither the server nor the slave device is able to obtain a signed or decrypted message when acting alone.

Compared to the above cited document by MacKenzie and Reiter and to the above mentioned second approach by the IETF, it is an advantage of the invention that resources may be used via several devices and by different users concurrently. The invention does not technically restrict the number of devices that can be members of the authorization domain.

Compared to the above mentioned first approach by the IETF, it is an advantage of the invention that the server acting alone cannot use the secret key.

It has to be noted that the server and the master functionalities can be placed physically into one device.

Preferred embodiments of the invention become apparent from the dependent claims.

In a preferred embodiment of the invention, a chained delegation of the authorization to access specific resources is enabled. That means that a slave device to which the authorization has been provided is able to further delegate the authorization to other slave devices. The rationale for such a feature is that even when the master device is currently unavailable, e.g. broken or lost, the user is able to expand his authorization domain as long as there is at least one slave device left to which the authorization was already delegated. Basically, the delegation between slave devices may take place in the same way as from the master device to a slave device. Since the slave device is not in possession of the entire secret master key, however, the server adds the part of the secret master key available at the server for the respective delegating slave device to a received part of the partial secret key available at the delegating slave device.

In either case, the server should verify the identity of a device requesting a partial secret key operation, e.g. based on an authentication key, and of the user using the requesting device, e.g. based on an entered password, before transmitting a message on which a partial secret key operation was applied to the requesting device.

In a further preferred embodiment of the invention, the key splitting performed by a delegator is made dependent on a randomized password provided by the delegatee. It is proposed more specifically, that the delegatee generates a password verification value based on a password input by a user of the delegatee and on a first random number. This password verification value is provided to the delegator. The delegator then determines the respective first part of the secret master key based on the received password verification value and on a second random number. The piece of information which is forwarded by the delegator to the delegatee may comprise in this case the second random number. The delegatee is thereby enabled to compute the respective first part of the secret master key whenever required based on the correct password entered by the user, on the first random number used for generating the password verification value and on the received second random number.

It is an advantage of this embodiment of the invention that the necessity is avoided that users have to reveal their long-term secrets to other users or to transfer them from one device to another, while it is at the same time ensured that only authorized users can access specific resources. The user of the device which requests an introduction into the authorization domain can choose a new password or use an old password based on which the secret master key is to be split, since the password itself is never revealed to the server or to the device from which an introduction to the authorization domain is requested. It is further an advantage that the respective first part of the secret master key does not have to be stored itself at the delegatee.

Advantageously, the master device and the server share a security association. This is an important feature, because otherwise a slave device can masquerade as the server and obtain both halves of the secret key. The security association between a master device and a server may consist of an authentication key associated to the master device, a confidentiality key associated to the master device and the lifetimes of these keys. The authentication key can be in particular a key of a symmetric authentication algorithm or a public digital signature algorithm, and the confidentiality key can be in particular a key of either a symmetric or an asymmetric algorithm. Preferably, both keys are keys of symmetric algorithms, since this increases the protocol speed and decreases the size of the message.

Further advantageously, a security association between the respective slave device and the server is also established. If this security association is based as well on symmetric mechanisms, the computation workload on the server side is decreased, and moreover, the slave device and the master device may now share exactly the same types of security associations. This allows extending the capability of the proposed authorization delegation to the slave device in a particularly simple way.

Moreover, a confidential channel between a respective delegator and a respective delegatee should be provided, for example, by PKI (Public key infrastructure), shared keys, a physical connection, etc. This ensures that only an authorized device can be the delegatee and receive the secret information sent by the delegator. In particular, it prevents a server from masquerading as a delegatee, and obtain both halves of the secret key.

The proposed delegation of authorization may be restricted in several ways.

A first type of restrictions is aimed at protecting the interests of the owner of the delegator. For this type of restrictions, a delegator may be enabled to define bounds of further delegations permitted to a delegatee.

A second type of restrictions, in contrast, is aimed at protecting the rights of third parties, for instance the rights of a copyright owner.

For the second type of restriction, the delegator must verify for each intended delegation that the involved server and/or the intended delegatee are compliant with restriction protocols associated to a particular authorization by checking whether the server and/or the intended delegatee comprise a certificate indicating this compliance. The certificate of a delegatee may indicate for instance that the delegatee is from a specific manufacturer guaranteeing a compliance. The certificate of a server may indicate for instance that the server is either from a specific manufacturer guaranteeing a compliance or is operated by a specific operator guaranteeing a compliance.

The restriction protocols may be for example DRM (digital rights management) protocols. DRM is a technology that is used for enabling and controlling copyright protected digital content usage and distribution. According to known DRM protocols, a rights issuer provides a device with a DRM voucher containing rules regarding a fair use of a content. According to an embodiment of the present invention, a respective delegator forwards the contents of a received voucher to each delegatee. A compliant delegatee will then copy these rules from the voucher to each request to a server to perform a partial key operation. Because the delegatee is compliant, it can be enforced to copy these rules from the voucher.

Based on the received rules, the server is able to check whether the request is within the limits assigned to the authorization of the master device. The server will only perform the requested partial key operation, in case the request is determined to be within the limits assigned to the authorization of the master device. The server will obey the policies from the voucher, because it is compliant.

One restriction of the second type might be that there is an overall limit on the number of devices that can be brought into the authorization domain. The number should be high enough not to bother ordinary users trying to make fair use of an authorization they obtained. But it should be low enough to discourage anyone from trying to make a business even in the absence of any limits in individual DRM vouchers, or if the limits have been somehow modified.

For realizing the invention, the steps of the proposed method associated to a delegating device are implemented in a delegator, i.e. in a master device and possibly in addition in one or more slave devices. The steps of the proposed method associated to a delegating device are implemented in a delegatee, i.e. in one or more slave devices. The steps of the proposed method associated to a server are implemented in a server, in particular in a network server.

Delegator and delegatee can be any electronic device that is suited to establish a communication with other electronic devices and with a server, e.g. mobile phones, PDAs, PCs, etc.

BRIEF DESCRIPTION OF THE FIGURES

Other objects, features and advantages of the present invention will become apparent from the following detailed description considered in conjunction with the accompanying drawings.

DETAILED DESCRIPTION OF THE INVENTION

Figure 1:
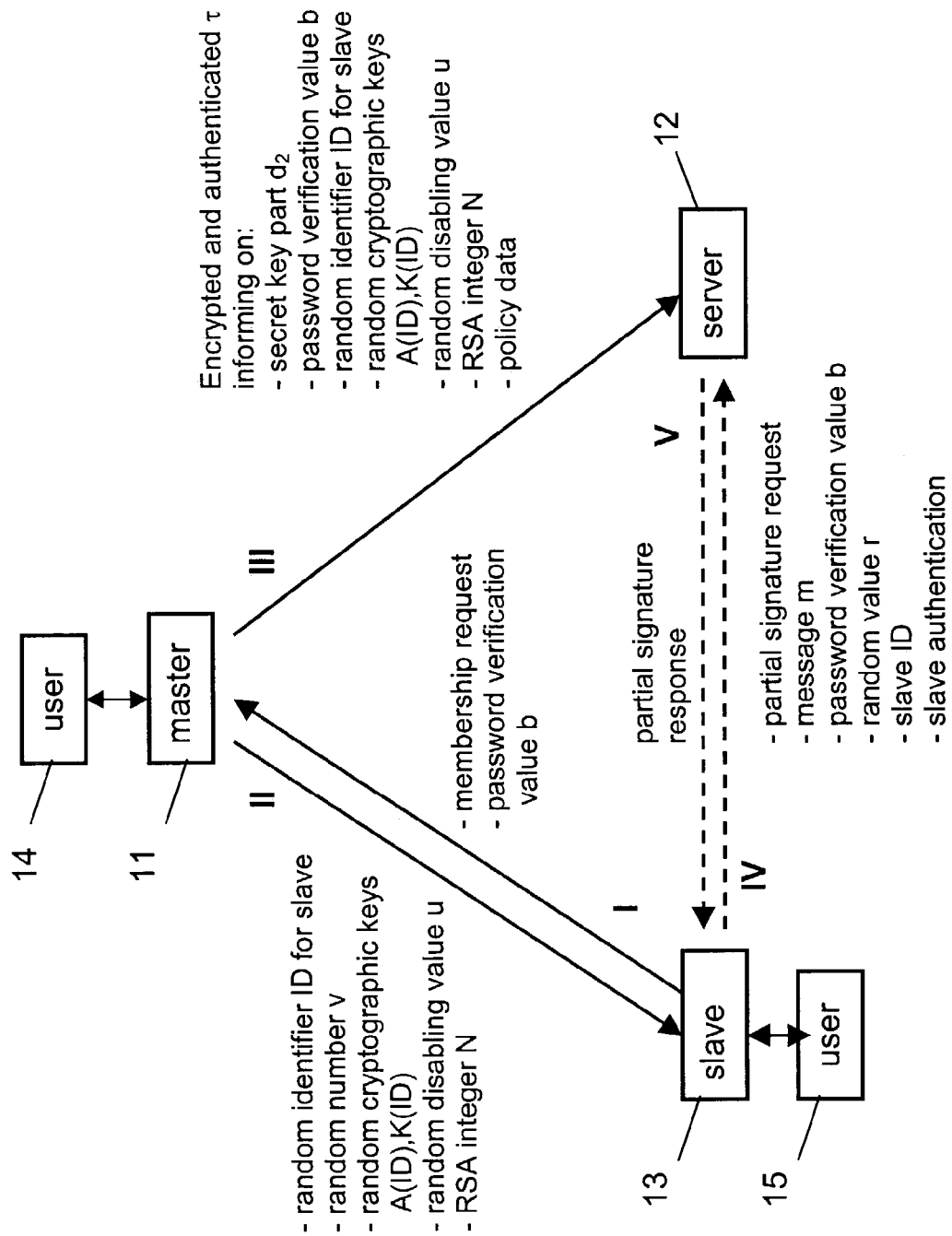
FIG. 1 illustrates a basic delegation of authorization in an embodiment of the method according to the invention.

FIG. 1 illustrates the delegation of an authorization in an embodiment of the method according to the invention. The figure presents to this end a master device 11, a network server 12 a slave device 13 between which messages are transmitted. To the master device 11 and the slave device 13, a respective user 14, 15 is associated.

The master device 11 is in possession of a secret key d which can be used as a secret RSA exponent for signing messages in order to obtain access to specific resources, e.g. to a bank account, or to decrypt messages encrypted using the corresponding RSA public key. The authorization to make use of the secret key d at least to some extent is to be delegated to the slave device 13 by introducing the slave device 13 into an authorization domain.

It is assumed that a security association between the master device 11 and the server 12, has been established. This may be done as part of an enrolling procedure with the server. The details of how the security association is set up is out of scope for this invention. This security association, which enables a secure transmission of data between the master device 11 and the server 12, consists of an authentication key A(master), a confidentiality key K(master) and the lifetimes of these keys. Both keys, A(master) and K(master), are keys of symmetric algorithms.

The messages transmitted between master device 11, server 12 and slave device 13 belong to a master-slave delegation protocol and are indicated in FIG. 1 by arrows I-V. Messages I, II and III represented by arrows with solid lines are employed for delegating an authorization from the master device 11 to the slave device 13, while messages IV and V represented by arrows with dashed lines are employed for using a delegated authorization.

In order to obtain a membership in an authorization domain, the slave device 13 first requests the user 15 to enter a password and generates a random number t'. The slave device 13 then computes a password verification value b by applying a function g on values t' and, i.e. $b=g(t', )$. The applied function g is a keyed hash function, for example HMAC-SHA1. Next the slave device 13 transmits a membership request along with value b to the master device 11. Due to random value t', the password verification value b reveals no information about the password to the master device 11. This allows the user 15 of the slave device 13 to use the same long-term password for other purposes, too.

Upon receipt of the membership request, the master device 11 asks its user 14 whether the request is to be granted. The user 14 can consent to the request by entering a valid password.

In case the user 14 consents to the request, the master device 11 then generates an identity value ID by which the server 12 can identify a specific security association that will be established between the server 12 and the requesting slave device 13. The master device 11 further generates a random authentication key A(ID) and a random confidentiality key K(ID). Keys A(ID) and K(ID) form the cryptographic parameters of the security association that will be shared between the slave device 13 and the server 12.

The master device moreover generates a random number v. The master device 11 then computes a first half-key $d_1$ by using generated random number v and received random number b as variables in a keyed hash function f, i.e. $d_1 = f(v,b)$. By using the random number v in addition to received random number b for calculating first half-key $d_1$, the master device 11 does not have to trust the pseudorandom generator of the slave device 13. The master device 11 further calculates a second half-key $d_2$ as the difference between the available key d and the computed first half-key $d_1$, i.e. $d_2 = d - d_1$. Finally, the master device 11 generates a disabling key u. The disabling key u can be generated for example by applying a cryptographic hash function on some random number t. If t is sent to the server 12, it will mark the half-key $d_2$ as revoked.

Next, the private values that are intended for the server 12 are encrypted at the master device 11 by the key K(master) to form a token. The included values comprise slave authentication key A(ID), slave confidentiality key K(ID), password verification value b, disabling key u, second half-key $d_2$ and RSA modulus N.

Based on token, a dedicated membership ticket for slave device 13 is created. The membership ticket is generated by authenticating the generated ID value, token and, optionally, policy data with the authentication key A(master).

The optional policy data has a structure comprising, for example, a delegation bound and a content bound. The delegation bound indicates the maximum number of allowed further delegations from the slave device 13 to other slave devices, as will be explained further below. The content bound, on the other hand, is used if the message to be signed or the encrypted message contains some pre-defined structure including attributes whose values can be compared against this bound. One example of usage of this bound is fixing the allowed amount of a transaction.

From the generated values, the values v, u, ID, A(ID) and K(ID) are now transmitted from the master device 11 to the slave device 13 in message II. Message II is transmitted via a confidential channel to the slave device 13, since it contains secret keys A(ID) and K(ID). The confidential channel can be given by a physically secure connection or be based on a cryptographic security association between the master and the slave. This security association can be based on symmetric key algorithms or public key algorithms. When setting up such security associations users may perform the initial authentication of the devices using approaches described in the documents "Enhancements to Bluetooth baseband security", in Proceedings of Nordsec 2001, Copenhagen, November 2001, by C. Gehrmann and K. Nyberg, or "The personal CA—PKI for a Personal Area Network", IST Mobile & Wireless Telecommunications Summit, Greece June 2002, by C. Gehrmann, K. Nyberg, and J. Mitchell. In case the security association is based on public key algorithms, the confidential channel is formed by encrypting message II using a public key belonging to the slave device 13. The public key can be transmitted to the master device 11 for example in message I. The master device 11 must verify the authenticity of this public key before using it. In order to enable such a verification, methods described in the above mentioned two papers can be used. For a more straightforward approach, the slave device 13 may send message I including the public key and show a fingerprint of its public key on its display. The master device 11 then shows the fingerprint of the received public key on its display. Now the user(s) 14, 15 of the devices 11, 13 can check whether the two fingerprints match. If they do, the master device 11 is authorized to proceed with the delegation transaction. A user-friendly technique for displaying public key fingerprints is to use visual hashes.

The slave device 13 stores all values received in message II and the internally generated random value t' to some secure persistent storage. Internally generated value b, in contrast, is deleted. The received and stored value v allows the slave device 13 to compute half-key $d_1$ with a keyed has function f(v, ) corresponding to the keyed hash function f(v,b) used by the master device 11 for computing half-key $d_1$. A password verification value is calculated anew to this end each time it is required from a password supplied by user 15 and from random number t' stored in the device 13.

With another message III transmitted from the master device 11 to the server 12, the required security association between the slave device 13 and the server 12 is established and the second half-key $d_2$ provided to the server 12. Message III comprises to this end the generated ticket, which the server 12 verifies and stores into its database. Message III can be transmitted by the master device 11 before or after the transmission of message II.

Based on the values transmitted in messages II and III, the slave device 13 is now able to perform private key operations on messages independently of the master device 11, in order to obtain access to specific resources associated to the public key of the master device 11.

The usage of such a RSA private key operation will now be explained with reference to the fourth and a fifth message IV, V indicated in FIG. 1.

At the beginning of the private key operation, the user 15 of the slave device 13 is requested to enter a password, and the slave device determines a password verification value by applying the hash function g(t', ) on stored random number t' and received password.

The slave device 13 then determines a string containing the identification value ID, a label "priv_key_op" and an encryption of the message m on which the private key operation is to be performed, of an encoding value r and of password verification value. The encryption is performed using confidentiality key K(ID). The label "priv_key_op" indicates that the server 12 is to perform a private key operation as opposed to a further delegation operation, which will be explained further below. Next, the slave device applies the authentication algorithm using key A(ID) on the determined value, resulting in a value.

The slave device 13 then sends a partial private key operation request comprising the values and as message IV to the server 12.

When the server 12 receives values and, it will search for the ID number associated to the slave device 13 in its database. Based on the ID number, the server obtains all the information that was transmitted within received from the master device for this specific slave device 13, i.e. the values A(ID), b, u, d2, N and K(ID). Any further operation is aborted, in case the second half-key $d_2$ is disabled by disabling value u.

Subsequently, the server 12 authenticates the slave device 13. To this end, the server 12 applies the authentication algorithm using key A(ID) to the received value and compares the result with received value. In case the compared values are not equal, the procedure is aborted.

The server may then decrypt the encrypted part of by means of the confidentiality value K(ID), in order to obtain message m, encoding value r and password verification value. Based on the obtained value, the server 12 now authenticates the user 15 by verifying that is equal to b, i.e. that the user 15 of the slave device 13 entered the correct password. If the server 12 can authenticate the slave device 13 but not the user 15, the server 12 may keep count of successive incorrect password attempts. If the count exceeds a given bound, the server 12 may assume that the slave device 13 has been stolen and abort the procedure.

In case policy data with a content bound was comprised in the ticket provided to the server 12 for this slave device 13, the server 12 also checks whether the values in the message m are within the limits provided for these values by the policy data. In case the values in message m are not within these limits, the procedure is aborted.

After a successful authentication procedures, the server 12 performs a partial private key operation on the received message m and the received encoding r based on the second half-key $d_2$ according to the formula=encode$(m,r)^{d2}$(mod N).

Since only the original master device 11 has access to the entire private key d, it cannot be assumed that slave devices 13 acting as delegators in a chained delegation, which will be described below, could perform computations modulo (N). Therefore, reduction modulo (N) proposed in the above cited document by MacKenzie and Reiter for computing the second half-key $d_2$ by the master device 11 was omitted in the presented embodiment of the invention. Since $d_1$ is generated as an output from a hash function, it may happen that $d_2$ is a negative integer. If this is the case, the server 12 computes first the private key operation with the positive integer $-d_2$, and subsequently computes the inverse of the resulting number modulo N. With this convention, the server 12 can always perform partial private key operation, even if its exponent is a negative number.

Value resulting in the partial private key operation is encrypted based on confidentiality key K(ID) and provided to the slave device 13 as encrypted value in message V.

When the slave device 13 receives the partial private key operation response from the server 12, it decrypts the received value with its confidentiality key K(ID). Further, it generates the first half-key $d_1$ using the stored value v and the recently generated value by applying the above mentioned function f(v, ).

The slave device applies the obtained half key $d_1$ on the message m and combines it by multiplication with the result of the partial private key operation received from the server according to the formula s=encode$(m,r)^{d1}$(mod N). The result of this computation is the desired result s, if $s^e$≡encode (m,r) (mod N). This provides also an implicit authentication of the server 12. In case the last verification is positive, the slave device 13 may transmit the values s and r to the server providing the desired resources.

The protocol described with reference to FIG. 1 allows the master device 11 to delegate its rights to a slave device 13, which slave device 13 is thereby introduced into the authorization domain. There is no technical limitation on the number of slave devices that the master device 11 may introduce in this way into the authorization domain.

In the presented embodiment of the invention, a slave device 13 which is a member of the authorization domain may also introduce other slave devices into the authorization domain. This aspect of the embodiment of the invention will now be described with reference to FIG. 2.

Figure 2:
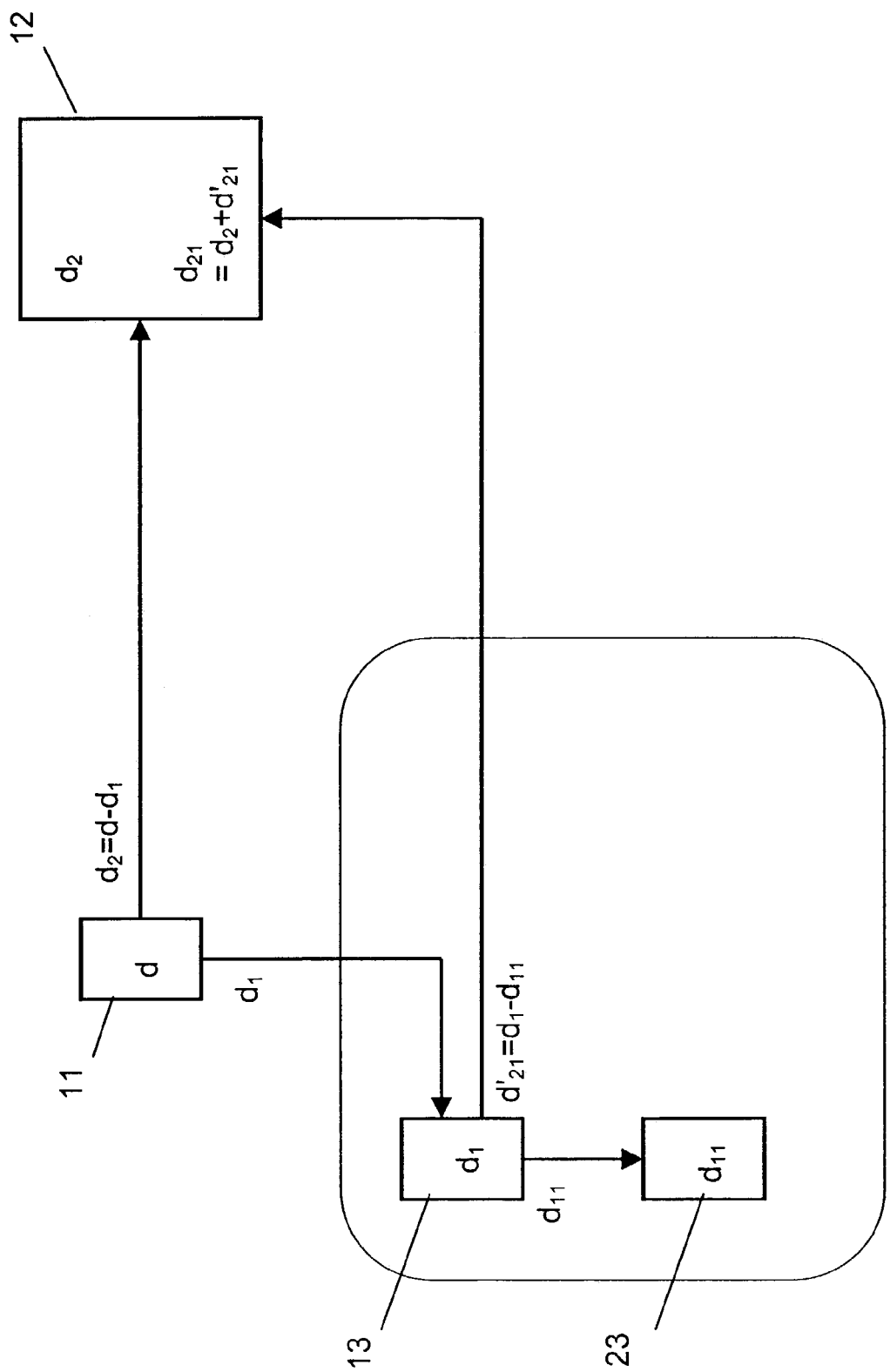
FIG. 2 illustrates a chained delegation of authorization in the embodiment of FIG. 1.

In FIG. 2, master device 11, server 12 and slave device 13 of FIG. 1 are depicted again. In addition, a second slave device 23 is shown.

Based on the initialization procedure described with reference to FIG. 1, the first slave device 13 is able to calculate half-key $d_1$, while the server 12 is in possession of a complementary half-key $d_2$.

The first slave device 13 is allowed to further delegate the received authorization to the second slave device 23 without having to involve the master device 11, unless the master device 11 transmitted policy data to the server 12 indicating that a further delegation is not allowed.

The procedure for the chained delegation corresponds basically to the procedure explained with reference to FIG. 1, except that the first slave device 13 takes the role of the master device 11. Therefore, only the differences in the processing will be described in detail. A difference is due to the fact that the first slave device 13 is only able to calculate half-key $d_1$, thus it is not in possession of the entire secret key d like the master device 11. Further, the first slave device 13 has to be allowed to further delegate the authorization.

Upon a delegation request by the second slave device 23 with a message corresponding to message I of FIG. 1, the first slave device 13 generates a further first half-key $d_{11}$ based on a random number and provides this random number to the second slave device 23 in a message corresponding to message II of FIG. 1. Moreover, the first slave devices 13 calculates a value $d'_{21}$ with $d'_{21}=d_1-d_{11}$ and transmits it in a message corresponding to message III of FIG. 1 to the server 12. Next, the server 12 checks the number of delegations already made by the first slave device 13 and compares this number to the delegation bound which was received before as policy data from the master device 11. If this number exceeds the delegation bound, then the server 12 does not allow the delegation.

In case the delegation is allowed, the server 12 adds the stored value of first half-key $d_2$ to the newly received value $d'_{21}$ to obtain a value $d_{21}$ as further second half-key. Obviously, the resulting further second half-key $d_{21}$ is $d_{21}=d_2+d'_{21}=d_2+d_1-d_{11}=d-d_{11}$. Thereby, the second slave device 23 becomes a member of the authorization domain, because the second slave device 23 and the server 12 possess half-keys $d_{11}$, $d_{21}$ which allow them to share the RSA private key function. A private key operation is performed exactly as with messages IV and V explained above, where values $d_1$ and $d_2$ are substituted by values $d_{11}$ and $d_{21}$.

As becomes apparent, the described embodiment of the invention maintains the advantages of the method presented by MacKenzie and Reiter in the above cited document. As in the solution of this document, the presented method according to the invention involves minimal invasiveness, since it does not require an agreement from communication partners. Communication partners are not aware that a signature was constructed or that an encrypted message will be decrypted using the assistance of a network server. As in the solution by MacKenzie and Reiter, a minimal trust on the network servers is required, since the server by itself cannot use the private key. It only has to be trusted that the server will stop co-operating with a slave device if the disabling key for that slave device is disclosed and that the server obeys the requested policies. Since the server by itself cannot perform a complete private key operation, it is also a less attractive point of attack. Further, if a device is lost, stolen or removed from the authorization domain, it is not necessary to change the domain keypair. It is also not required to revoke the public key, i.e. to inform all peers who use the public key or certify it. As in the solution by MacKenzie and Reiter, the server verifies both, the user and the device, before the device is allowed to use an authorization.

In addition, the described method according to the invention does not put any technical restrictions on the number of devices that may become members of the authorization domain. In particular, a chained delegation between slave devices is enabled. The chained delegation does not require the availability of the master device. Still, the master device can restrict the usage of its secret key by providing appropriate policy data to the server. Each delegating party can add its own policies indicating whether it does or does not want to provide further delegation rights. The user of the respective delegatee can moreover choose a new password, or use an old password. The password itself is never revealed to the respective delegator or to the server.

It is to be noted that the described embodiment constitutes only one of a variety of possible embodiments of the invention, and also the described embodiment can be varied in many ways. A selection of possible variations will be presented in the following.

In the described embodiment of the invention, secret key d is split by the master device into half keys of equal size. In contrast to this approach, the workload of either the server or the slave device could be minimized by making its half-key particularly small, e.g. $1/10^{th}$ of the size of the original key.

In the described embodiment of the invention, the master device chooses the values ID, u, A(ID) and K(ID). Alternatively, these values could be chosen as well by the server or by the slave device. If the server chooses these values, the protocol has to be interactive, i.e. the server must participate in the delegation process because these values have to be provided to the master device before message II. However, in case the master device chooses these values by itself as proposed, it does not have to rely on the quality of randomness available to the other entities.

In the described embodiment of the invention, the policy data is included directly in the membership ticket, i.e. without encryption. In case the policy data should remain confidential, it is also possible to include it in the data that is encrypted to token.

In the described embodiment of the invention, the membership ticket is provided directly from the respective delegator to the server. In an alternative approach, the membership ticket could also be provided to the server via the respective delegatee. In FIG. 1, for example, the membership ticket generated by the master device 11 could be transmitted to the slave device 13 in message II. The slave device 13 then forwards the membership ticket to the server 12 in message IV. In case is provided online, i.e. together with a request for a partial private key operation, the server must verify and decrypt every time when the slave device requests a partial private key operation. This can be avoided by storing the membership ticket in the server the first time the slave device transmits such a request to the server. Thereafter, does not have to be provided again.

In another alternative, the membership ticket could be provided from the respective delegator directly to the server each time the respective delegatee requests a partial private key operation from the server, i.e. not in an initializing step as in the above described embodiment of the invention.

In any case, the generation of the ticket is separated from the use of the ticket.

In the above cited document by MacKenzie and Reiter, a random string is employed, which is used as a one time pad for encrypting the result of the partial private key operation before it is sent from the server to the device. In the above described embodiment of the invention, instead an encryption of the result with a confidentiality key K(ID) is employed. This is not necessary. The computational workload of the server can be further reduced, if the slave provides the server with such a one time pad encrypted as part of the string in message IV to be used by the server to encrypt its reply message V to the slave device.

Figure 3:
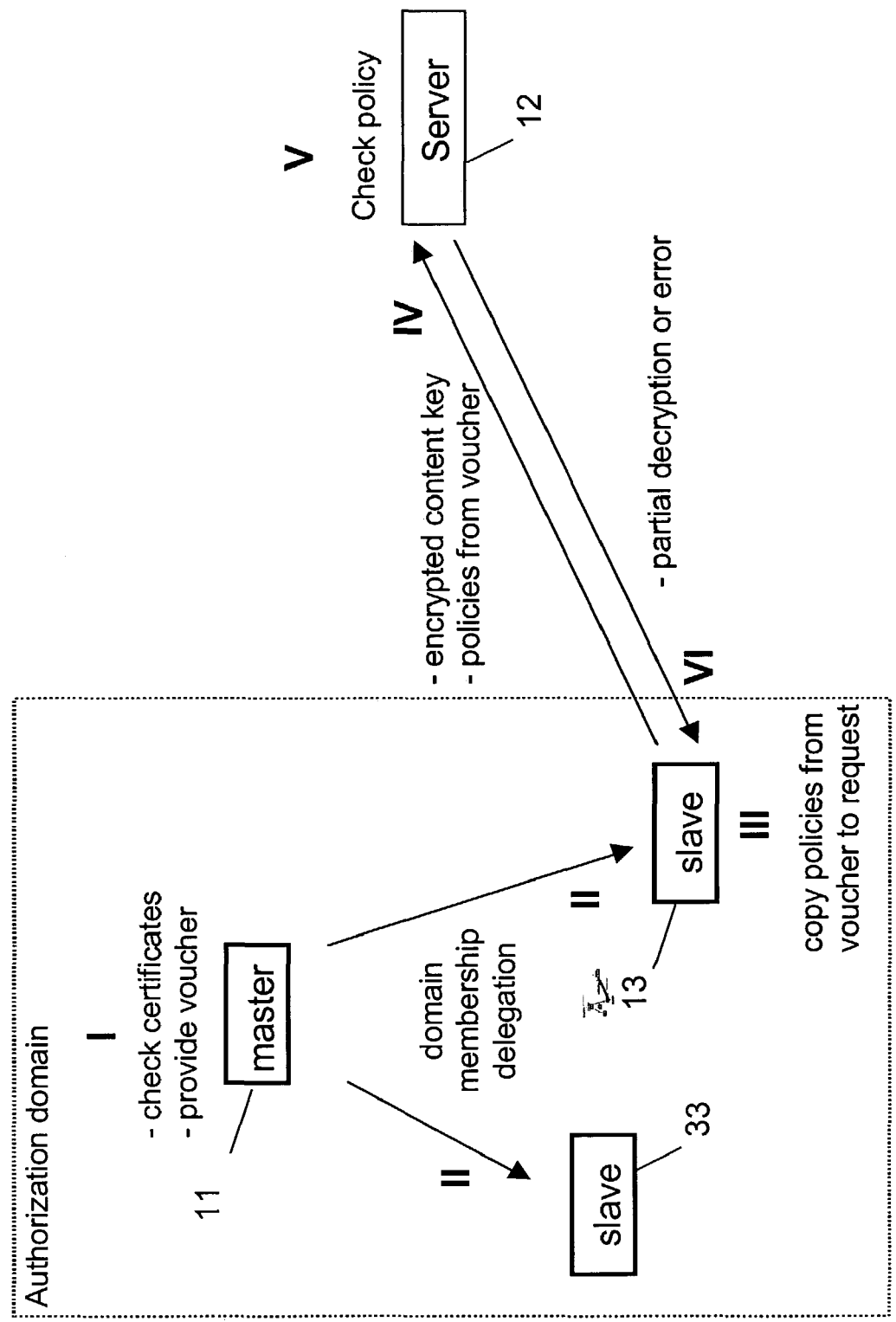
FIG. 3 illustrates a combination of the delegation according to the embodiment of FIG. 1 with DRM protocols.

FIG. 3 illustrates a further embodiment of the invention which is integrated in a DRM system.

For the DRM system, it is assumed that each involved device has a public/private key pair. It is further assumed that a specific manufacturer provides each device with a device certificate for the public key of the device. The device certificate assures compliance to DRM specifications. Finally, the DRM relevant portions of each device are assumed to be tamper resistant.

In a conventional DRM system, a device first requests and receives a desired content from a content provider. In order to be able to make use of the content, the devices requires a content key. The device transmits its certificate to a rights issuer. The right issuer verifies the received certificate of the requesting device. In case it turns out to be valid, the rights issuer transmits a DRM voucher to the requesting device. The DRM voucher contains rules for DRM and the content key encrypted with the public key of the device. The device is then able to decrypt the key by means of a trusted DRM software that can access the RSA private key of the device. Finally, the device is able to decrypt the received content with the decrypted content key K and to make use of the received content within the scope of the DRM rules.

In the embodiment illustrated in FIG. 3, this DRM concept is combined with the approach presented with reference to FIGS. 1 and 2.

FIG. 3 shows a master device 11, a network server 12, a first slave device 13 and a second slave device 33.

A user of the master device 11 has bought a permission to use a content available on a content server by transmitting the certificate of the master device 11. Before a rights issuer gave permissions to a content, the compliance of the master device 11 was checked from its certificate. Similar as in the embodiments described with reference to FIGS. 1 and 2, the master device 11 is in possession of a secret key d which can be used as secret RSA exponent for decrypting a message which is encrypted using the corresponding RSA public key. In this case, the message is a content key which is required to decrypt the bought content. The authorization to make use of the secret key d at least to some extent can be delegated to a slave device 13, 33 by introducing it into an authorization domain.

Before the master device 11 performs the delegation as described above with reference to FIG. 1, including the splitting of key d, it first checks the certificates of the server 12 and of the respective slave device 13, 33. More specifically, the master device 11 determines whether the slave device 13, 33 is from a predetermined manufacturer assuring compliance of all issued devices to the DRM specifications and whether the server 12 is from a predetermined manufacturer or operated by a predetermined operator assuring compliance of all servers to the DRM specifications. In case the checked certificates assure compliance of the slave device 13, 33 and of the server 12 to the DRM specifications, the master device 11 further indicates its own capability to render content in a DRM voucher and transmits this voucher to the server 12 and to the slave device 13, 33. In addition, the master device 11 indicates to the slave device 13, 33 and to the server 12 delegation limits for the slave device 13, 33.

These limits may comprise the length of the remaining delegation chain and the number of delegations the slave device 13, 33 could make.

Only then, the master device 11 introduces the slave device 13, 33 into the authorization domain as described with reference to FIG. 1. The delegation operation again comprises creating a dedicated membership ticket for the slave device 13, 33 and sending this ticket to the server 12, either directly or via the respective slave device 13, 33.

When one of the slave devices 13 in the authorization domain wishes to use a copyright-protected, encrypted content, it retrieves this content from the content server. Since the content is encrypted, the slave device 13 requires a content key for the decryption. Before the slave devices 13 in the authorization domain can transmit a partial private key operation request to the server 12 as described above with reference to FIG. 1, however, the slave devices 13 copies the policy from the DRM voucher received from the master device 11 into its request. The request for a partial decryption transmitted from the slave devices 13 to the server 11 thus includes an encrypted content key as message m and in addition policies from the DRM voucher.

The server 12 receives the request. Before it replies as described above with reference to FIG. 1, the server 12 compares the policy included in the request with the current state, in order to check whether the slave device 13 is allowed to access the desired content. The server 12 may compare for instance how many devices are allowed to use the content concurrently according to the DRM policy and how many devices are already using the content.

In case the server 12 detects that the request is within the allowed limits, it transmits a reply to the requesting slave device 13 which includes the requested partial decryption of the content key. If the premises of the rules are not satisfied, the server 12 returns an error indication to the requesting slave device 13.

In case the slave devices 13 receives a partially decrypted content key, it can decrypt the other part of the content key using its own half-key from the master device 11. The slave device 13 then finalizes the decryption of the content key so that it can decrypt and access the content.

As in the embodiments described with reference to FIGS. 1 and 2, the server only has half-keys and is thus not able to access a content key and thereby a protected content by itself. At the same time, a fair use of protected content can be ensured with the embodiment described with reference to FIG. 3.

In each of the described embodiments, the master device 11, the slave devices 13, 23, 33 and the server 12 obviously comprise a processing component for performing the processing described for the respective unit, a storage component for storing all values required at the respective unit for the described processing, and a communication component for performing the described exchange of data with a respective other unit.

Although the invention has been shown and described with respect to best mode embodiments thereof, it should be understood by those skilled in the art that the foregoing and various other changes, omissions and additions in the form and detail thereof may be made therein without departing from the spirit and scope of the invention.

The invention claimed is:

1. A method comprising:
generating at a master device a first part and a second part of a predetermined secret master key, said predetermined secret master key being available at said master device and said first part and said second part being combinable to said secret master key, wherein resources are accessible via messages on which a secret key operation was applied with said secret master key and wherein said master device is acting as a delegator of an authorization to use said specific resources;
forwarding a piece of information to a slave device acting as a delegatee of said authorization, which piece of information enables said slave device to perform a partial secret key operation on messages based on said first part of said secret master key; and
forwarding said second part of said secret master key to a server for enabling said server to perform a partial secret key operation on messages received from said slave device based on said second part of said secret master key.

2. A method according to claim 1, wherein a delegatee to which said authorization was delegated is enabled to act as delegator for delegating said authorization to another slave devices acting as delegatee, said method comprising for said further delegation:
generating at said delegator a further first part and another part of said first part of said secret master key, which can be generated at said delegator, said further first part and said other part being combinable to said first part of said secret master key;
forwarding a piece of information to said delegatee, which piece of information enables said delegatee to perform a partial secret key operation on messages based on said further first part;
forwarding said other part of said first part of said secret master key to said server; and
combining a second part of said secret master key available at said server for said delegator with said other part provided by said delegator to a further second part of said secret master key for enabling said server to perform a partial secret key operation on messages received from said delegatee based on said further second part of said secret master key.

3. A method according to claim 1, wherein generating a first part and a second part of a predetermined secret master key at a respective delegator is preceded by:
generating a password verification value at a respective delegatee based on a password input by a user of said delegatee and on a first random number; and
providing said password verification value to said delegator; wherein said respective first part of said secret master key is determined at said delegator based on said password verification value received from said delegatee and on a second random number and wherein said piece of information which is forwarded by said delegator to said delegatee comprises said second random number for enabling said delegatee to generate said respective first part of said secret master key.

4. A method according to claim 1, wherein said delegator determines a respective second part of an available secret key as the difference between said available secret key and a randomly generated first part of said secret master key.

5. A method according to claim 1, wherein a delegator provides in addition policy data to said server restricting the bounds of the authorization that may be delegated to a delegatee.

6. A method according to claim 5, wherein said bounds comprise a delegation bound indicating the maximum number of allowed further delegations of said authorization by a respective delegatee acting as a delegator for further delegatees.

7. A method according to claim 5, wherein said bounds are content bounds comprising at least one value which can be compared to the values of attributes in a message on which a secret key operation is to be performed, said message having a pre-defined structure including said attributes.

8. A method according to claim 1, wherein said delegator transmits a respective second part of an available secret key computed for a specific delegatee directly to said server once during an initialization process for a specific delegatee.

9. A method according to claim 1, wherein said delegator transmits a respective second part of an available secret key computed for a specific delegatee directly to said server upon a request by said server each time said specific delegatee requests a partial secret key operation on a message.

10. A method according to claim 1, wherein said delegator transmits a respective second part of an available secret key computed for a specific delegatee to said server via said specific delegatee once during an initialisation process.

11. A method according to claim 1, wherein said delegator transmits a respective second part of an available secret key computed for a specific delegatee to said server via said specific delegatee, said specific delegatee forwarding said respective second part to said server each time it requests a partial secret key operation on a message from said server.

12. A method according to claim 1, wherein a confidential channel can be established between a respective delegator and a respective delegatee for securely transmitting confidential information between said delegator and said delegatee.

13. A method according to claim 1, wherein a security association is formed between a respective delegator and said server for securely transmitting confidential information between said delegator to said server.

14. A method according to claim 13, wherein said security association is realized with a symmetric algorithm using cryptographic parameters associated to said delegator, which cryptographic parameters are available at said delegator and at said server.

15. A method according to claim 1, wherein a security association is formed between a respective delegatee and said server for securely transmitting confidential information between said delegatee and said server.

16. A method according to claim 15, wherein said security association is realized with a symmetric algorithm using cryptographic parameters associated to said delegatee and available at said delegatee and at said server.

17. A method according to claim 16, wherein said cryptographic parameters associated to said delegatee are generated by the respective delegator and provided to said delegatee and to said server.

18. A method according to claim 1, wherein said delegator forwards said piece of information to a slave device only in case said delegator determines that said slave device comprises a tamper resistant certificate indicating that said slave device is compliant with predetermined rights issuer rules.

19. A method according to claim 1, wherein said delegator forwards said second part of said secret master key to said server only in case said delegator determines that said server comprises a tamper resistant certificate indicating that said server is compliant with predetermined rights issuer rules.

20. A method according to claim 1, wherein a delegatee makes use of a delegated authorization by transmitting a request to perform a partial secret key operation on an included message to said server, said server performing a partial secret key operation on said received message based on a respective second part of said secret master key and transmitting a resulting message as response message to said delegatee, and wherein said delegatee performs a partial secret key operation on said transmitted message based on said computed first part of said secret master key and combines a resulting message with said response message received from said server.

21. A method according to claim 20, wherein a delegator transmits to said server a password verification value provided by a respective delegatee to said delegator during the delegation of said authorization, which password verification value is generated by said delegatee based on a password entered by a user of said delegatee and on a random number, wherein said delegatee transmits to said server together with each request to perform a partial secret key operation on a message a password verification value generated by said delegatee based on a password entered by a user of said delegatee for the respective request and on said random number, and wherein said server verifies the identity of a user using said delegatee before performing said requested partial secret key operation by comparing said password verification values received from said delegator and from said delegatee.

22. A method according to claim 20, wherein said server verifies the identity of a delegatee requesting a partial secret key operation on a message before performing a requested partial secret key operation on a received message.

23. A method according to claim 20, wherein said delegator transmits a voucher to said delegatee to which it forwards said piece of information, said voucher indicating an extent of a right of said delegator to share said authorization, wherein a delegatee includes in a request transmitted to said server to perform a partial secret key operation an indication of said right of said delegator to share said authorization received in said voucher, and wherein said server performs a partial secret key operation on a message received in a request by a delegatee only in case it determines that said request by said delegatee is covered by said indicated extend of said right of said delegator to share said authorization.

24. A method according to claim 23, wherein said indication in said voucher comprises the number of devices allowed to make use of a specific content, for which said requested partial secret key operation is required, at the same time.

25. A delegator
configured to generate a first part and a second part of an available predetermined secret master key, said first part and said second part being combinable to said secret master key, wherein resources are accessible via messages on which a secret key operation was applied with said secret master key, and wherein said delegator is a delegator of an authorization to use said specific resources;
configured to forward a piece of information to a slave device acting as a delegatee of said authorization, which piece of information enables said slave device to perform a partial secret key operation on messages based on said first part of said secret master key; and
configured to forward said second part of said secret master key to a server for enabling said server to perform a partial secret key operation on messages received from said slave device based on said second part of said secret master key.

26. A delegatee
configured to request an authorization to use specific resources from a delegator, wherein said resources are accessible via messages on which a secret key operation is applied with a predetermined secret master key available at said delegator;

configured to receive from said delegator a piece of information, configured to use said piece of information to perform a partial secret key operation on messages based on a first part of said secret master key; and configured to co-operate with a server which is configured to perform a partial secret key operation on messages based on a second part of said secret master key, wherein said first part and said second part of said secret master key are combinable to said secret master key.

27. A server configured to receive from a delegator a second part of a secret master key, said second part being combinable with a first part of said secret master key available at a delegatee, wherein resources are accessible via messages on which a secret key operation was applied with said secret master key, configured to receive from said delegatee a second part of said first part of said secret master key, said second part of said first part of said secret master key being combinable with a first part of said first part of said secret master key available at a second delegatee to said first part of said secret master key; and configured to combine said second part of said secret master key with said second part of said first part of said secret master key to obtain a further second part of said secret master key for enabling said server to perform a partial secret key operation on messages received from said second delegatee based on said further second part of said secret master key.

28. A method comprising:

requesting an authorization to use specific resources from a delegator, wherein said resources are accessible via messages on which a secret key operation is applied with a predetermined secret master key available at said delegator;

receiving from said delegator a piece of information, using said piece of information to perform a partial secret key operation on messages based on a first part of said secret master key; and co-operating with a server which is configured to perform a partial secret key operation on messages based on a second part of said secret master key, wherein said first part and said second part of said secret master key are combinable to said secret master key.

29. A method comprising:

receiving from a delegator a second part of a secret master key, said second part being combinable with a first part of said secret master key available at a delegatee, wherein resources are accessible via messages on which a secret key operation was applied with said secret master key, receiving from said delegatee a second part of said first part of said secret master key, said second part of said first part of said secret master key being combinable with a first part of said first part of said secret master key available at a second delegatee to said first part of said secret master key; and combining said second part of said secret master key with said second part of said first part of said secret master key to obtain a further second part of said secret master key for being enabled to perform a partial secret key operation on messages received from said second delegatee based on said further second part of said secret master key.

30. An apparatus comprising:

means for generating a first part and a second part of an available predetermined secret master key, said first part and said second part being combinable to said secret master key, wherein resources are accessible via messages on which a secret key operation was applied with said secret master key, and wherein said apparatus is a delegator of an authorization to use said specific resources;

means for forwarding a piece of information to a slave device acting as a delegatee of said authorization, which piece of information enables said slave device to perform a partial secret key operation on messages based on said first part of said secret master key; and means for forwarding said second part of said secret master key to a server for enabling said server to perform a partial secret key operation on messages received from said slave device based on said second part of said secret master key.

31. An apparatus comprising:

means for requesting an authorization to use specific resources from a delegator, wherein said resources are accessible via messages on which a secret key operation is applied with a predetermined secret master key available at said delegator;

means for receiving from said delegator a piece of information, means for using said piece of information to perform a partial secret key operation on messages based on a first part of said secret master key; and means for co-operating with a server which is configured to perform a partial secret key operation on messages based on a second part of said secret master key, wherein said first part and said second part of said secret master key are combinable to said secret master key.

* * * * *